United States Patent [19]

Nakamura et al.

[11] 4,286,017

[45] Aug. 25, 1981

[54] HEAT-SENSITIVE RECORDING PAPER

[75] Inventors: Masato Nakamura; Saburo Nishimatsu, both of Tokyo; Toshitake Itoh, Shizuoka; Katsumi Moronuki, Koganei, all of Japan

[73] Assignee: Honshu Seishi Kabushiki Kaisha, Tokyo, Japan

[21] Appl. No.: 73,878

[22] Filed: Sep. 10, 1979

[30] Foreign Application Priority Data

| | | | |
|---|---|---|---|
| Sep. 25, 1978 | [JP] | Japan | 53-116595 |
| Apr. 18, 1979 | [JP] | Japan | 54-46704 |

[51] Int. Cl.³ .............................................. B32B 9/00

[52] U.S. Cl. .................................. 428/328; 427/150; 427/151; 427/152; 428/324; 428/327; 428/330; 428/331; 428/332; 428/338; 428/339; 428/913

[58] Field of Search .............. 428/913, 324, 327, 328, 428/330–332, 338, 339; 427/150–152; 430/338

[56] References Cited

U.S. PATENT DOCUMENTS

| | | | |
|---|---|---|---|
| 3,859,112 | 1/1975 | Kohmura et al. | 428/913 |
| 4,151,748 | 5/1979 | Baum | 427/150 |
| 4,168,845 | 9/1979 | Oeda et al. | 427/150 |
| 4,173,677 | 11/1979 | Nakano et al. | 427/150 |
| 4,181,771 | 1/1980 | Hanson et al. | 427/150 |

FOREIGN PATENT DOCUMENTS

| | | |
|---|---|---|
| 52-980 | 7/1978 | Japan . |
| 52-19333 | 9/1978 | Japan . |
| 52-32111 | 10/1978 | Japan . |

*Primary Examiner*—Ronald H. Smith
*Assistant Examiner*—Janyce A. Bell
*Attorney, Agent, or Firm*—Armstrong, Nikaido, Marmelstein & Kubovcik

[57] ABSTRACT

Disclosed is a heat-sensitive recording paper comprising a colorless or pale-colored chromogenic substance and a phenolic substance for coloring the chromogenic substance by heating, in which amorphous synthetic aluminum silicate and/or amorphous synthetic magnesium silicate is incorporated in a recording layer.

2 Claims, No Drawings

HEAT-SENSITIVE RECORDING PAPER

BACKGROUND OF THE INVENTION (1) Field of the Invention

The present invention relates to a heat-sensitive recording paper. More particularly, the present invention relates to a heat-sensitive recording paper which eliminates troubles caused when recording is carried out in a heat-sensitive recording apparatus including a fixed thermal printing head (dots), such troubles including, for example, such sticking troubles as the sticking of the heat-sensitive recording paper to the thermal printing head, and such head troubles as adhesion of soil to the thermal printing head.

(2) Description of the Prior Art

It has been well known that color development is caused by reaction of a colorless or pale-colored chromogenic substance such as Crystal Violet Lactone with a phenolic substance such as bisphenol A (4,4'-isopropylidene diphenol). It also is known from, for example, U.S. Pat. No. 3,539,375 that color development is thermally caused by utilizing this reaction.

In order to obtain a heat-sensitive recording paper by coating and drying on a substrate a homogeneous aqueous dispersion of a heat-sensitive recording composition of the two-component type comprising a chromogenic substance and a phenolic substance such as mentioned above, there has been adopted a method in which the above-mentioned two color-developing components are separately dispersed by means of, for example, a ball mill in an aqueous medium containing a water-soluble binder to form fine particles having a size of several microns or less, the resulting two dispersions are mixed and the mixture is coated and dried on a substrate. In order to improve the thermal response, adaptability to color development under pressure and slip characteristic, wax particles, was emulsions, particles of fatty acid salts, particles of fatty acid amides and the like have been incorporated in the above-mentioned heat-sensitive recording composition. Furthermore, in order to improve whiteness and graphic property of the surface of a recording material, fillers such as clay, talc and titanium oxide have been incorporated in the above-mentioned heat-sensitive recording composition.

However, these conventional heat-sensitive recording papers are still insufficient and defective. For example, a so-called sticking phenomena, that is, sticking of the recording paper to the thermal printing head, is caused in the recording step, and smooth feeding of recording papers is inhibited or the recording characteristics are degraded. Furthermore, parts of the components contained in the recording layer adhere to the thermal printing head and soil adhering to the thermal printing head contaminate the recording papers. Moreover, because of the presence of a filler such as clay, talc or titanium oxide in the heat-sensitive recording paper, abrasion of the thermal printing head is accelerated.

As means for eliminating these defects, there have been proposed a method in which a slipping agent such as a metal salt of a fatty acid is incorporated in a recording layer and a method in which a non-sticking wax layer or a polymer film layer is formed on a recording layer. According to these methods, the number of the preparation steps is increased to render the operations complicated, and the improving effect attained is not sufficient.

Clay, talc, titanium oxide, zinc oxide or other additive customarily used for paper coating is sometimes incorporated in the heat-sensitive recording composition so as to improve whiteness and graphic property of the surface of the heat-sensitive recording paper, and such additive exerts a certain effect of preventing sticking or adhesion of soil to the thermal printing head but the effect is not sufficient.

In short, all of these known methods are defective in that the improving effect attained is insuficient.

It is known that in the heat-sensitive recording paper, color development reaction is caused by heating the chromogenic substance and phenolic substance contained in the recording layer by the thermal printing head, whereby preparing the heat-molten substance. In this heating step, the binder and other heat-fusible substances are simultaneously softened or melted, and these substances show adhesiveness to the thermal printing head while they are cooled and solidified and an undesirable sticking phenomenon is caused. Furthermore, these molten substances are converted to soils and contaminate the surface of the recording layer or the periphery of the thermal printing head.

We researched the causes of head troubles in the above-mentioned color development reaction and examined the composition and internal structure of the recording layer. As a result, it was found that when amorphous synthetic aluminum silicate and/or amorphous synthetic magnesium silicate is incorporated as a filler in the interior of a recording layer, there can be attained very high effects of preventing occurrence of the sticking phenomenon, preventing contamination of the thermal printing head and reducing abrasion of the thermal printing head.

SUMMARY OF THE INVENTION

The present invention is characterized in that a specific compound is incorporated in a recording layer of a known heat-sensitive recording paper containing a chromogenic substance and a phenolic substance.

It is a primary object of the present invention to provide a novel heat-sensitive recording paper in which sticking of the recording paper to a thermal printing head is prevented.

Another object of the present invention is to provide a heat-sensitive recording paper which can reduce head troubles such as adhesion of soil to a thermal printing head of a thermal printing apparatus.

Still another object of the present invention is to provide a heat-sensitive recording paper which can reduce abrasion of the thermal printing head of a thermal printing apparatus.

DETAILED DESCRIPTION OF THE INVENTION

(1) Compounds Used for Heat-Sensitive Recording Paper

Substances ordinarily used for the heat-sensitive recording paper of the present invention will now be described, through compounds usable in the present invention are not limited to those described hereinafter.

The composition for formation of the heat-sensitive recording paper of the present invention comprises as the main ingredients a colorless or pale-colored chromogenic substance, a phenolic substance and a binder. These components will now be described in detail.

(a) Colorless or Pale-colored Chromogenic Substance

As the colorless or light-colored color-developing substance, there are used so-called leuco compounds capable of developing a color by reaction, such as triphenylmethane type leuco compounds, triphenylmethanephthalide type lauco compounds, fluorane type leuco compounds, laucoauramine type leuco compounds, spiropyran type leuco compounds, indoline type leuco compounds and indigo type leuco compounds. In the present invention, it is especially preferred to use triphenylmethane type and fluorane type chromogenic substances.

The chromogenic substance is used in the state dispersed in water in the form of particles having a particle size smaller than 6 μm, preferably smaller than 1 μm.

(b) Phenolic substance

The phenolic substance is a compound which is softened or molten under heating and develops a color on contact with the above-mentioned leuco compound. For example, there can be mentioned 4,4′-isopropylidene diphenol (bisphenol A) having a melting point of 156° C., 4-tert-butylphenol having a melting point of 94° to 99° C., 4-phenylphenol having a melting point of 165° C., α-naphthol having a melting point of 94° C., β-naphthol having a melting a point of 121° C., 4-hydroxyacetophenone having a melting point of 107° C., 2,2′-dihydroxydiphenyl having a melting point of 110° C., 2,2′-methylene-bis(4-chlorophenol) having a melting point of 177° C., 4,4′-sec-butylidene diphenol having a melting point of 188° C., 4,4′-isopropylidene-bis(2-methylphenol) having a melting point of 136° C., 4,4′-isopropylidene-bis(2,6-dimethylphenol) having a melting point of 168° C.

In the present invention, it is important that the phenolic substance used should have a melting point higher than 90° C.

The phenolic substance is used in the state dispersed in water in the form of particles having a particle size smaller than 6 μm, preferably smaller than 1 μm.

(c) Binder

The use of a water-soluble binder is preferred. Any of known binders can be used so far as it appropriately coats or encapsules the above-mentioned compounds (a) and (b) when they are dispersed in a solvent and it does not cause color development at a temperature ranging from room temperature to a level below the heating temperature of a thermal printing head of a thermal printing apparatus.

As such water-soluble binder, there can be mentioned, for example, casein, polyvinyl alcohol (hereinafter referred to as "PVA"), carboxymethyl cellulose, sodium alginate, methyl cellulose, hydroxyethyl cellulose, polyvinyl pyrrolidone and polyacrylamide. Furthermore, a latex of a styrene-butadiene copolymer, polyvinyl acetate, a polyacrylic acid ester or the like may be used in combination with such water-soluble binder.

The water-soluble binder is used in an amount of about 10 to about 50% by weight based on the total composition.

It is considered that the water-soluble binder acts as a protective colloid for the chromogenic substance (a) and the phenolic substance (b). It was found that good results are obtained when the water-soluble binder is added to the components (a) and (b) independently and the resulting two mixtures are combined (the water-soluble binder may be further added to the resulting composition according to need).

(d) Other Additives

The composition for a heat-sensitive recording layer may further comprise other additives, for example, a surfactant for improving the adaptability to the coating operation, a slipping agent and a sensitivity-adjusting agent for improving recording characteristics, and a water-resisting agent for improving the water resistance.

As the surface active agent, there are used nonionic and anionic surfactants such as sodium lauryl sulfate, polyoxyethylene octylphenol ether and polyoxyethylene nonylphenol ether.

As the slipping agent, there are used, for example, polyethylene wax, paraffin wax and fatty acid metal salts.

As the sensitivity-adjusting agent, there are used, for example, stearic acid amide, oleic acid amide, hydroxystearic acid amide, a phthalic acid ester, ethylene-bisstearic acid amide and phthalide.

As the water-resisting agent, there are used substances acting as a cross-linking hardener for the water-soluble binder, for example, glyoxal, dialdehyde starch, chromium alum, polyethylene oxide and a melamineformalin resin.

(e) Specific Compound Used In Present Invention

In the present invention, amorphous synthetic aluminum silicate and/or amorphous synthetic magnesium silicate is used. The former silicate is higher in the effect of preventing the sticking trouble and head trouble.

The reason why the above-mentioned specific amorphous synthetic silicate is effective for preventing the sticking trouble or adhesion of soil to the thermal printing head has not been completely elucidated. However, it is believed that the shape of particles of the silicate and the surface characteristics, such as the adsorbing property, of the silicate are factors in the attainment of the above-mentioned effects.

The amorphous synthetic aluminum silicate or magnesium silicate is incorporated in the thermal recording composition in an amount of 10 to 70% by weight, preferably 20 to 60% by weight. If the amount of the amorphous synthetic aluminum silicate or magnesium silicate is smaller than 10% by weight, the sticking-preventing effect is insufficient. If the amount of the amorphous synthetic aluminum silicate or magnesium silicate exceeds 70% by weight, the color developing property is reduced. Other filler may be used in combination with the amorphous synthetic aluminum silicate or magnesium silicate.

The above-mentioned specific silicate is used in the form of particles having a size smaller than about 6 μm, preferably smaller than 1 μm. Accordingly, a commercially available product is used after milling if necessary.

(A) Amorphous Synthetic Aluminum Silicate

Generally, aluminum silicate is naturally produced. The aluminum silicate is often called "clay". The clay is ordinarily used as a whitening agent or opacity improving agent.

Natural products of aluminum silicate have a high crystallinity, and therefore, they are not suitably for use in the present invention. In the present invention, it is indispensable to use white and fine amorphous synthetic aluminum silicate. The amorphousness can easily be determined by X-ray diffractiometry or electron microscope observation.

The amorphous synthetic aluminum silicate referred to in the present invention can easily be synthesized by adding a water-soluble aluminum salt to a solution of sodium silicate. The resulting product is used after milling to the above-mentioned particle size if necessary.

(B) Amorphous Synthetic Magnesium Silicate

Generally, magnesium silicate is naturally produced, and various talcs differing in composition are known as magnesium silicate. These have a high crystallinity. More specifically, they have a rhombic system or monoclinic system and take a leaf-like, massive or fibrous shape. Such crystalline products are not suitable in the present invention. In the present invention, it is indispensable to use white and fine amorphous synthetic magnesium silicate. The amorphousness can easily be determined by X-ray diffractiometry or electron microscope observation.

(II) Preparation of Heat-Sensitive Recording Composition and Heat-Sensitive Recording Paper (a) Preparation of Heat-Sensitive Recording Composition The heat-sensitive recording composition that is used in the present invention may be prepared, for example, according to the following procedures:

A dispersion or solution containing (a) a colorless or pale-colored chromogenic substance, (c) a water-soluble binder and, if desired, (d) other additive is first prepared (liquid A).

Similarly, a dispersion or solution containing (b) a phenolic substance, (c) a water-soluble binder and, if desired, (d) other additive is prepared (liquid B).

As the dispersion medium, there are used solvent not dissolving or hardly dissolving the components (a) and (b), such as n-heptane, n-hexane, petroleum ether, carbon tetrachloride, kerosine and water. From the viewpoints of environmental protection and availability, the use of water is especially preferred. Dispersion (milling) is accomplished by such means as a ball mill, an attritor, a sand grinder, a colloidal mill, pebble mill or a three-roll mixer. The treatment is conducted for a time sufficient to form fine particles having a size smaller than several microns.

The liquids A and B and, if desired, a liquid C containing (d) other additive are mixed together. At this step, other additive (d) not incorporated in the liquids A and B may be incorporated.

Thus, a heat-sensitive recording composition (dispersion coating composition) including particles having a particle size smaller than several microns is obtained.

If both the components (a) and (b) are simultaneously dispersed or a solvent capable of dissolving one or both of the components (a) and (b) is used as the solvent, color development is often caused by contact of both the components (a) and (b) during the dispersing treatment and the resulting recording paper has a white background. Therefore, such method should be avoided.

(b) Preparation of Heat-Sensitive Recording Paper

The so obtained heat-sensitive recording composition is coated on a substrate such as paper or plastic sheet by using an air knife coater, a blade coater, a reverse coater, a champion coater or a gravure coater. The amount coated is determined depending on the kind of the composition, the intended use of the recording material and other factors. Generally, it is preferred that the amount coated be about 1 to about 15 $g/m^2$ as measured after drying.

If necessary, in order to improve the contact between the recording surface and the thermal printing head and effectively transfer the heat from the thermal printing head to the recording layer, the step of smoothening the recording is added.

The present invention will now be described in detail by reference to the following Examples that by no means limit the scope of the invention.

EXAMPLE 1

(a) Preparation of Heat-Sensitive Recording Composition

| | |
|---|---|
| Liquid A: | |
| Crystal Violet Lactone | 3 parts by weight |
| Stearic acid amide | 15 parts by weight |
| PVA (2% aqueous solution) | 20 parts by weight |
| Synthetic aluminum silicate | 10 parts by weight |
| Water | 20 parts by weight |
| Liquid B: | |
| Bisphenol A | 9 parts by weight |
| Stearic acid amide | 10 parts by weight |
| PVA (2% aqueous solution) | 20 parts by weight |
| Water | 20 parts by weight |
| Liquid C: | |
| PVA (15% aqueous solution) | 40 parts by weight |

The liquids A and B were separately dispersed by a centrifugal rotary ball mill for 4 hours, and the liquids A, B and C were mixed together to prepare a heat-sensitive recording composition (paint). In this composition, 90% or more of the dispersed particles of synthetic aluminum silicate had a size smaller than 2 $\mu m$.

(b) Preparation of Heat-Sensitive Recording paper

The so obtained paint was coated on a ordinary paper (fine paper) having a base weight of 50 $g/m^2$ so that the amount coated was 8 $g/m^2$ after drying, to obtain a heat-sensitive recording paper.

EXAMPLE 2

(a) Preparation of Heat-Sensitive Recording Composition

| | |
|---|---|
| Liquid A: | |
| Crystal Violet Lactone | 3 parts by weight |
| Stearic acid amide | 15 parts by weight |
| Synthetic magnesium silicate | 10 parts by weight |
| PVA (2% aqueous solution) | 20 parts by weight |
| Water | 20 parts by weight |
| Liquid B: | |
| Same as used in Example 1. | |
| Liquid C: | |
| Same as used in Example 1. | |

(b) Preparation of Heat-Sensitive Recording Paper

A heat-sensitive recording paper was prepared in the same manner as described in Example 1.

EXAMPLE 3

(a) Preparation of Heat-Sensitive Recording Composition

| | |
|---|---|
| Liquid A: | |
| 3-pyrrolidino-6-methyl-7-anilinofluorane | 3 parts by weight |
| Stearic acid amide | 15 parts by weight |
| Synthetic magnesium silicate | 5 parts by weight |
| Synthetic aluminum silicate | 5 parts by weight |
| PVA (2% aqueous solution) | 20 parts by weight |
| Water | 30 parts by weight |
| Liquid B: | |
| Bisphenol A | 9 parts by weight |
| Ethylene-bis-stearoamide | 10 parts by weight |
| PVA (2% aqueous solution) | 20 parts by weight |
| Water | 20 parts by weight |
| Liquid C: | |
| PVA (15% aqueous solution) | 40 parts by weight |

A paint was prepared from the foregoing liquid A, B and C in the same manner as described in Example 1.

(b) Preparation of Heat-Sensitive Recording Paper

In the same manner as described in Example 1, the so obtained paint was coated on a ordinary paper (fine paper) having a base weight of 50 $g/m^2$ so that the amount coated was 8 $g/m^2$ as measured after drying.

The recording papers obtained in Examples 1 through 3 were tested with respect to sticking, adhesion of soil to the thermal printing head and abrasion of the thermal printing head. The results obtained are shown in Table 1.

COMPARATIVE EXAMPLES 1 to 4

Recording papers were prepared in the same manner as described in Example 1 except that instead of the synthetic aluminum or magnesium silicate used in the liquid A, there was used the same amount of clay (natural aluminum silicate, Comparative Example 1), talc (natural magnesium silicate, Comparative Example 2), titanium oxide (Comparative Example 3) or zinc oxie (Comparative Example 4). These comparative recording papers were similarly tested to obtain results shown in Table 1.

TABLE 1

| | Filler | Sticking* | Soil Adhesion to Head** | Head Abrasion*** Abrasion quantity (μ) | Head Abrasion*** Resistance change ($R_{500}/R_0$) |
|---|---|---|---|---|---|
| Example 1 | amorphous synthetic aluminum silicate | 0 | 0 | 0 | 1.00 |
| Example 2 | amorphous synthetic magnesium silicate | 0 | 0 | 0 | 1.00 |
| Example 3 | amorphous synthetic aluminum silicate and amorphous synthetic magnesium silicate | 0 | 0 | 0 | 1.00 |
| Comparative Example 1 | clay | Δ | Δ | 2 | 1.04 |
| Comparative Example 2 | talc | Δ | Δ | 3 | 1.05 |
| Comparative Example 3 | titanium oxide | × | × | 9 | 1.10 |
| Comparative Example 4 | zinc oxide | × | × | 5 | 1.10 |

Note:
The sticking and soil adhesion to the head were evaluated according to the following scale:
0: good
Δ: bad
×: very bad
*Sticking test method:
The heat-sensitive recording paper was scanned and solid-printed under a printing voltage of 11.5 V at a printing atmosphere temperature of −5° C. by using a thermal printing apparatus (OKI FAX 600 manufactured by Oki Denki).
Since the sticking phenomenon occurs more readily as the temperature is low, a severe condition of the printing atmosphere temperature of −5° C. was adopted.
**Soil adhesion test method:
The heat-sensitive recording paper was solid-printed along a scanning length of 1 m by usin OKI FAX 600. The printing head was then wiped with a filter paper immersed with alcohol, and the filter paper was dried and the degree of contamination of the filter paper was examined with the naked eye.
***Head abrasion test method:
The heat-sensitive recording paper was printed along a length of 500 m by using a thermal printer (Divisumma manufactured by Olivetti), and the change of the resistance of the thermal printing head and the quantity of abrasion of the thermal printing head were determined. The change of the resistance is expressed by the formula of $R_{500}/R_0$ in which $R_{500}$ stands for the resistance of the thermal printing head after printing of 500 m and $R_0$ stands for the resistance of the thermal printing head before printing. A larger value indicates a larger loss of the thermal printing head. The abrasion quantity was measured by using a surface roughness meter of the pointer contact type.

From the results shown in Table 1, it will readily be understood that the recording papers prepared in Examples of the present invention by using heat-sensitive recording compositions including amorphous synthetic aluminum silicate and/or amorphous synthetic magnesium silicate excel over comparative heat-sensitive recording papers prepared by using ordinary white pigments such as clay, talc, titanium oxide and zinc oxide in the point that the sticking phenomenon is hardly caused, adhesion of soil to the thermal printing head is remarkably reduced and the thermal printing head is effectively prevented from abrasion.

COMPARATIVE EXAMPLE 5

A heat-sensitive recording paper was prepared in the same manner as described in Example 1 except that the dispersion treatment in the centrifugal rotary ball mill was conducted only for a very short time so that about 90% or more of particles of the amorphous synthetic aluminum silicate had a particle size exceeding 7 μm. When thermal printing was carried out on this recording paper, lack of dots was conspicuous and good image quality was not obtained.

What is claimed is:

1. In a heat-sensitive recording paper having a heat-sensitive recording layer comprising a colorless or pale-colored chromogenic substance and a phenolic compound, the improvement characterized in that from 10 to 70% by weight of at least one amorphous synthetic compound selected from the group consisting of amorphous synthetic aluminum silicate and amorphous synthetic magnesium silicate is incorporated into said heat-sensitive recording layer.

2. A heat-sensitive recording paper as set forth in claim 1 wherein the amorphous synthetic compound has a particle size smaller than 6 $\mu$m.

* * * * *